(12) United States Patent
Quin et al.

(10) Patent No.: US 8,271,969 B2
(45) Date of Patent: Sep. 18, 2012

(54) METHOD AND APPARATUS FOR DETERMINING THE STATE OF A COMPUTING DEVICE

(75) Inventors: Spencer Quin, Kitchener (CA); Yongqian Gao, Kitchener (CA)

(73) Assignee: Research In Motion Limited, Waterloo, ON (CA)

( * ) Notice: Subject to any disclaimer, the term of this patent is extended or adjusted under 35 U.S.C. 154(b) by 1011 days.

(21) Appl. No.: 11/836,165

(22) Filed: Aug. 9, 2007

(65) Prior Publication Data

US 2009/0044182 A1    Feb. 12, 2009

(51) Int. Cl.
*G06F 9/44* (2006.01)
*G06F 7/00* (2006.01)

(52) U.S. Cl. ........ 717/170; 717/168; 717/169; 717/173; 707/638

(58) Field of Classification Search ........................ None
See application file for complete search history.

(56) References Cited

U.S. PATENT DOCUMENTS

| | | | |
|---|---|---|---|
| 6,151,708 A * | 11/2000 | Pedrizetti et al. | 717/173 |
| 6,789,255 B1 * | 9/2004 | Pedrizetti et al. | 717/169 |
| 7,200,390 B1 | 4/2007 | Henager et al. | |
| 7,565,419 B1 * | 7/2009 | Kwiatkowski et al. | 709/223 |
| 7,716,660 B2 * | 5/2010 | Mackay | 717/173 |
| 7,873,956 B2 * | 1/2011 | Kim et al. | 717/168 |
| 7,900,056 B1 * | 3/2011 | Murphy, Jr. | 713/189 |
| 2002/0092012 A1 * | 7/2002 | Shah | 717/170 |
| 2002/0170052 A1 * | 11/2002 | Radatti | 717/171 |
| 2003/0046675 A1 | 3/2003 | Cheng et al. | |
| 2003/0046676 A1 | 3/2003 | Cheng et al. | |
| 2003/0816689 | 10/2003 | Herle et al. | |
| 2004/0181788 A1 * | 9/2004 | Kester et al. | 717/168 |
| 2005/0257205 A1 | 11/2005 | Costea et al. | |
| 2006/0129689 A1 | 6/2006 | Ho et al. | |

(Continued)

FOREIGN PATENT DOCUMENTS

CN    1374589 A1    10/2002

(Continued)

OTHER PUBLICATIONS

Boyen et al., Forward-secure signatures with untrusted update, Oct. 2006, 10 pages, <http://delivery.acm.org/10.1145/1190000/1180430/p191-boyen.pdf>.*

(Continued)

*Primary Examiner* — Thuy Dao
(74) *Attorney, Agent, or Firm* — Perry + Currier

(57) ABSTRACT

According to embodiments described in the specification, a method and apparatus, for determining the state of a computing device is described, by first determining at least one unique code associated with at least one file resident on the computing device, the at least one unique code representative of a state of the at least one file. Then at least one unique reference code associated with at least one update file is determined, the at least one update file for updating said at least one file resident on the computing device, and the at least one unique reference code representative of an expected state of the at least one file resident on the computing device. Finally, the state of the computing device is determined to be in an expected state if the at least one unique code matches the at least one unique reference code, and in an unexpected state if the at least one unique code does not match the at least one unique reference code.

20 Claims, 4 Drawing Sheets

U.S. PATENT DOCUMENTS

2009/0064125 A1* 3/2009 Venkatachalam et al. .... 717/170
2010/0138389 A1* 6/2010 Snapp ........................... 707/638

FOREIGN PATENT DOCUMENTS

| EP | 1519268 A2 | 3/2005 |
|---|---|---|
| EP | 1686469 A2 | 8/2006 |
| KR | 10-2003-037123 | 5/2003 |
| KR | 10-2005-0030534 | 3/2005 |
| KR | 1020050028245 A | 3/2005 |
| KR | 2006-0067842 | 6/2006 |
| KR | 1020060128173 A | 12/2006 |
| WO | 2007/062673 A1 | 6/2007 |

OTHER PUBLICATIONS

King et al., Distributed content-based visual information retrieval system on peer-to-peer networks, Jul. 2004, 25 pages, <http://delivery.acm.org/10.1145/1020000/1010619/p477-king.pdf>.*

Korean Application No. 10-2008-0076468 Office Action dated Apr. 27, 2010.
Examination Report, May 19, 2008, European Patent Office.
Korean Patent Application No. 10-2008-0076886 Office Action No. Oct. 29, 2010.
Canadian Patent Application No. 2,638,078 Office Action dated Feb. 7, 2011.
Computer File—from Wikipedia.
Related European Patent Application No. 07114070.1—Summons to attend oral proceedings dated Apr. 28, 2011.
Corresponding European Patent Application No. 07 114 069.3; EPO Communication Dated Jul. 26, 2011.
Related Korean Patent Application No. 10-2008-0076886 Office Action dated Jul. 29, 2011.
Corresponding Chinese Patent Application No. 200810129698.1 Office Action dated Apr. 28, 2012 (English Translation).
Related Chinese Patent Application No. 200810129697.7 Office Action dated Apr. 1, 2012 (English Translation).

* cited by examiner

METHOD AND APPARATUS FOR DETERMINING THE STATE OF A COMPUTING DEVICE

FIELD

The specification relates generally to software updates, and specifically to a method and apparatus for determining the state of a computing device.

BACKGROUND

Installation of software updates on a computing device can oftentimes be problematic due to the bandwidth available to transmit the software update to the computing device, and the computing power of the computing device itself. Generally, when software updates are installed on computing devices, the older version of the software is first uninstalled. In other words the old version of the software is completely deleted from the computing device, prior to the new version of the software being installed.

For many computing devices, including mobile and/or wireless computing devices, this situation can be problematic due to the enormous amount of data which may then have to be transmitted to, and processed by the computing device. Indeed, in many instances, there may be a limited amount of bandwidth available for transmitting the new version of the software to the computing device. For example, in wireless communication devices, the wireless transmission of data to implement a software update may involve sending hundreds of megabytes of data over a wireless network. However many wireless networks have limited data transmission rates and the transfer of the data can be a time-consuming process. Furthermore, under some business models, the user of the wireless communication device may be charged on a per volume rate for receipt of data, for example a certain fee per megabyte of data, and the receipt of the software update can prove to be expensive.

Even in scenarios where the new software is transmitted over a non-wireless network, the bandwidth of the non-wireless network may still be limited. For example, if a computing device is receiving a software update over the PSTN via a modem, the download of the software update may take hours. This includes scenarios where a mobile computing device is receiving a software update during a synchronization process via another computing device, such as a personal computer, which is receiving the software update from a limited bandwidth network.

In addition, the computing power of a mobile computing device may be limited, and processing the uninstallation of the old software, and the installation of the new software may prove to be a time consuming process.

Furthermore, in some instances, the new software may not be compatible with the current state of the computing device. In these instances, the installation of the update may result in the computing device becoming non-functional.

BRIEF DESCRIPTIONS OF THE DRAWINGS

Embodiments are described with reference to the following figures, in which.

DETAILED DESCRIPTION OF THE EMBODIMENTS

Figure 1:
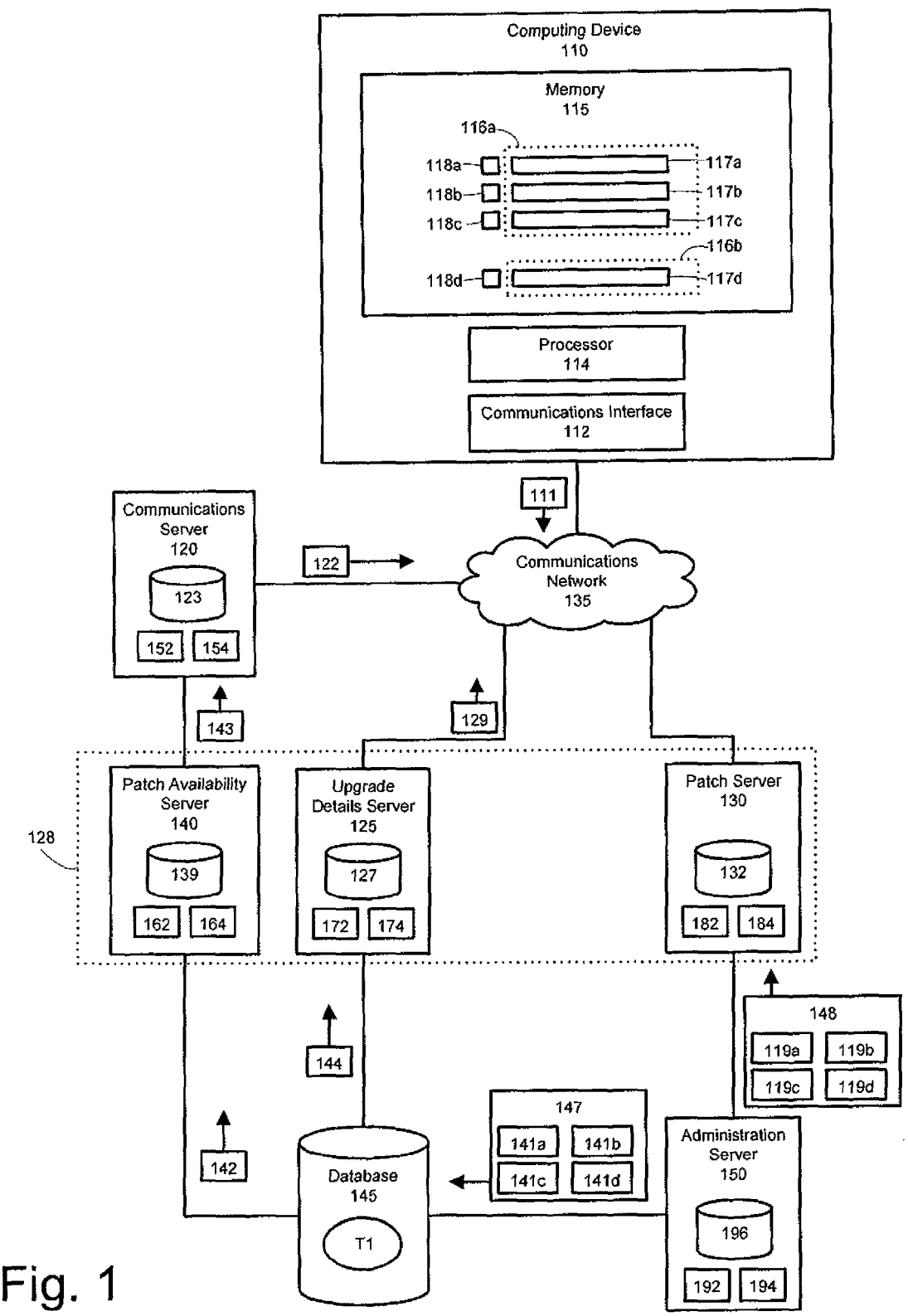
FIG. 1 depicts an architecture for determining the state of a computing device, according to a non-limiting embodiment.

A first broad aspect of an embodiment comprises a method of determining the state of a computing device. A first step of the method comprises determining at least one unique code associated with at least one file resident on the computing device, the at least one unique code representative of a state of the at least one file. A second step of the method comprises, determining at least one unique reference code associated with at least one update file, the at least one update file for updating the at least one file resident on the computing device, the at least one unique reference code representative of an expected state of the at least one file resident on the computing device. A third step of the method comprises, determining that the computing device is in an expected state if the at least one unique code matches the at least one unique reference code, and determining that the computing device is in an unexpected state if the at least one unique code does not match the at least one unique reference code.

In some embodiments of the first broad aspect, the computing device comprises a handheld electronic device.

In other embodiments of the first broad aspect, the at least one unique code comprises at least one of a plurality of unique codes, each of the plurality of unique codes associated with one of a plurality of files resident on the computing device, and the at least one unique reference code comprises at least one of a plurality of unique reference codes, each of the plurality of unique reference codes associated with one of a plurality of update files, each update file for updating at least one of the plurality of files resident on the computing device, and the method further comprising determining that a first portion of the computing device is in an expected state if a first subset of the plurality of unique codes matches a first subset of the plurality of unique reference codes, and that a second portion of the computing device is in an unexpected state if a second subset of the plurality of unique codes does not match a second subset of the plurality of reference codes.

In other embodiments of the first broad aspect, determining at least one unique code comprises processing state data, the state data representative of a state of the computing device, and further comprising receiving the state data from the computing device. In some of these embodiments the method further comprises requesting the state data from the computing device, and receiving the state data is responsive to requesting the state data.

In yet further embodiments of the first broad aspect, determining the at least one unique reference code comprises processing software update data, and the method further comprises receiving the software update data from a remote entity. In some of these embodiments, the method further comprises requesting the software update data from the remote computing entity, and receiving the software update data is responsive to requesting the state data.

In other embodiments of the first broad aspect, the method further comprises generating the at least one unique code by applying a hash algorithm to the at least one file resident on the computing device, and generating the at least one unique reference code by applying the hash algorithm to at least one reference file, wherein the at least one reference file is equivalent to the at least one file resident on the computing device. In some of these embodiments, the hash algorithm comprises one of SHA-1, SHA-224, SHA-256, SHA-384, and SHA-512.

In further embodiments of the first broad aspect, the method further comprises compiling a message processable by the computing device, the message comprising data for instructing the computing device to request the at least one update file from at least one remote computing entity, and transmitting the message to the computing device.

In second broad aspect of an embodiment comprises a computing apparatus for determining the state of a handheld electronic device. The computing apparatus comprises an interface for receiving state data from the handheld electronic device and software update data from a remote computing entity. The computing apparatus further comprises a processor, coupled to the interface, for:

processing the state data to determine at least one unique code associated with at least one file resident on the handheld electronic device, the at least one unique code representative of a state of the at least one file;

processing the software update data to determine at least one unique reference code associated with at least one update file, the at least one update file for updating the at least one file resident on the handheld electronic device, the at least one unique reference code representative of an expected state of the at least one file resident on the handheld electronic device;

determining that the handheld electronic device is in an expected state if the at least one unique code matches the at least one unique reference code, and determining that the handheld electronic device is in an unexpected state if the at least one unique code does not match the at least one unique reference code; and compiling a message processable by the handheld electronic device, if the handheld electronic device is in an expected state, the message comprising data for instructing the handheld electronic device to request the at least one update file from at least one remote computing entity; and causing the message to be transmitted to the handheld electronic device, via the interface.

In some embodiments of the second broad aspect, the processor is further enabled for causing a request for the state data to be transmitted to the handheld electronic device via the interface, and receiving the state data via the interface, responsive to transmitting the request for the state data.

In other embodiments of the second broad aspect, the processor is further enabled for causing a request for the software update data to be transmitted to the remote computing entity via the interface, and receiving the software update data via the interface, responsive to transmitting the request for the software update data.

FIG. 1 depicts an architecture for determining the state of a computing device 110 in communication with a communications server 120, an update details server 125 and a patch server 130, via a communications network 135. The communications server 120 is in further communication with a patch availability server 140. The patch availability server 140 and the update details server 125 are in communication with a database 145, the database 145 for storing data associated with updating a computing device. The database 145 and the patch server 130 are in further communication with an administration server 150. The communications server 120, the update details server 125, the patch server 130, the patch availability server 140, the database 145 and the administration server 150 may be in communication via at least one communications network. In some embodiments, the at least one communications network may comprise the communications network 135, while in other embodiments the at least one communications network may be different from the communications network 135. In some embodiments the at least one communications network may comprise at least one of a local area network (LAN), a wide area network (WAN), a wireless network, a packet-based communications network (such as the internet), the PSTN, a cell network, a WiFi network, a WiMax network, or a combination thereof.

In some embodiments the communications server 120, the update details server 125, the patch server 130, the patch availability server 140, the database 145 and the administration server 150 may be co-located, while in other embodiments the communications server 120, the update details server 125, the patch server 130, the patch availability server 140, the database 145 and the administration server 150 may be located remote from each. In some embodiments, at least one of the communications server 120, the update details server 125, the patch server 130, the patch availability server 140, the database 145 and the administration server 150 may be elements of at least one computing apparatus. In one non-limiting embodiment, the update details server 125, the patch server 130, and the patch availability server 140 are elements of a computing apparatus 128.

In some embodiments the communications network 135 may comprise at least one of a local area network (LAN), a wide area network (WAN), a wireless network, a packet-based communications network, such as the internet, and or the PSTN, a cell network, a WiFi network, a WiMax network, or a combination thereof.

In some embodiments, the computing device 110 may comprise a handheld electronic device, operable to communicate with the communications server 120, the update details server 125 and the patch server 130 via the communications network 135. In these embodiments, the computing device 110 may comprise a cell phone, a personal digital assistant (PDA), a WiFi-based communications device, a WiMax based communications device, or a combination thereof. In other embodiments, the computing device 110 may comprise another type of handheld electronic device. In some embodiments, the handheld electronic device may be enabled to communicate via a wireless network, while in other embodiments, the handheld electronic device may be enabled to communicate via a wired network. In yet other embodiments, the handheld electronic device may be enabled to communicate via either a wireless or a wired network. In some embodiments the handheld electronic device is enabled to communicate with the communications server 120, the update details server 125 and the patch server 130, via another computing device local to the handheld electronic device, which is in communication with the communications network 135. In these embodiments, the handheld electronic device may be enabled to communicate with the computing device local to the handheld device via a wired or a wireless link (e.g. WiFi, Bluetooth, and/or a hardwired serial bypass, such as a USB link).

In other embodiments, the computing device 110 may comprise a computing device which is not a handheld electronic device. In these embodiments, the computing device 110 may comprise a personal computer or a laptop computer. In these embodiments the computing device may be operable to communicate via a wired network, a wireless network, or a combination thereof.

The computing device 110 comprises a communications interface 112 to enable communications via the communication network 125. In embodiments where the communications network 135 comprises a wireless network, the communications interface 112 comprises a wireless communications interface, as known to one of skill in the art. Non-limiting examples of a wireless communications interface include, but are not limited to, a cell phone interface (e.g. CDMA, GSM, 1x, EVDO, UTMS, and the like), a WiFi interface, a WiMax interface, and the like. In embodiments where the communications network 135 comprises a wired communications network, the communications interface 112 comprises a wired communications interface, as known to one of skill in the art. In these embodiments, the communications interface 112 is enabled to connect to an edge device (not depicted) of the communications network 135, for example a modem. In some of these embodiments, the communications interface 112 may be enabled to connect to the edge device via another computing device, which is in communication with the communications network 135, as described above. In yet other embodiments the communications interface 112 may be enabled for communications via either a wired or a wireless communications network.

The computing device 110 further comprises a processor 114 for processing data. The computing device 110 further comprises a memory 115 for storing data, including files associated with applications. In some embodiments, an application stored at the computing device 110 comprises a single file resident at the computing device 110, while in other embodiments an application resident on the computing device 115 comprises a plurality of files resident on the computing device 110. For example, an application may comprise an executable file, such that when the executable file is processed by the processor 114, the application is accessible to a user of the computing device 110. The application may further comprise files storing data associated with the user of the computing device 110. The application may further comprise files storing data associated with the state of the application. Other types of files associated with an application may occur to one of skill in the art.

In some embodiments, files storing data associated with the state of a given file resident on the computing device 110 may also be stored in the memory 115. In these embodiments a file storing data associated with the state of a given file may comprise a unique code associated with the state of the given file. In some embodiments the unique code associated with the state of the given file may be stored in the memory 115 at the time its associated file is stored in the memory 115, for example at the time of installation of a given application. In these embodiments, computing device 110 may be enabled to generate the unique code using a given file resident at the computing device 110 as an input. In some of these embodiments, the unique code may be generated by the computing device 110 when a given file is stored at the computing device 110, while in other embodiments the unique code may be generated when the computing device 110 has been triggered to transmit a state of the computing device 110 via the communications network 135, for example via a hash algorithm installed at the computing device 110, as described below. By transmitting the unique code to a remote entity, the state of the computing device 110 may be identified to the remote entity, and specifically the state of the associated file resident on the computing device 110. In some embodiments, the given unique code is smaller in size than the file resident on the computing device 110. In other embodiments, the unique code may be associated with a state of the computing device 110, other than a state of a file resident on the computing device 110.

In some embodiments the unique code may be generated by the application of a hash algorithm to a given set of data (e.g. a file resident on the computing device 110). In general, the hash algorithm is operable to generate a different unique code for different given data sets, including two given data sets with only a small difference between them. Hence, the state of a given set of data can be distinguished from the state of a slightly different data set via the unique codes derived from applying the hash algorithm to each data set. In some embodiments, the unique code may be obtained by applying a hash algorithm from the secure hash algorithm (SHA) family of hash algorithms, for example SHA-1, SHA-224, SHA-256, SHA-384, and SHA-512, and the like. Other hash algorithms may occur to one of skill in the art.

In some embodiments, the unique code may be supplied by a remote entity, e.g. a software provider, or another computing entity in the architecture of FIG. 1. In some of these embodiments, the remote entity applies the hash algorithm to the file to be resident at the computing device 110, and supplies the unique code along with the file to be resident in the computing device 110. In other embodiments, the remote entity calculates the unique code for the file to be resident at the computing device 110, using a unique code generator, and supplies the unique code along with the file to be resident in the computing device 110. In these embodiments, the unique code may comprise a unique code which conforms to the Universally Unique Identifier (UUID) Standard. A non-limiting example of a unique code which conforms to the Universally Unique Identifier (UUID) Standard is a Globally Unique Identifier (GUID).

In a non-limiting example, FIG. 1 depicts four files 117a, 117b, 117c, and 117d, the files 117a, 117b, 117c, and 117d resident on the computing device 110, and stored in the memory 115. The files 117a, 117b, and 117c are associated with a first application 116a, while the file 117d is associated with a second application 116b. For example, the file 117a may comprise an executable file for running the first application 116a on the computing device 110, when the file 117a is processed by the processor 114. The file 117b may comprise data associated with the user of the computing device 110, the file 117b being periodically accessed and updated by the processor 114 while it is running the first application 116a. For example, the file 117b may contain user preference data, high scores and the like. The file 117c may comprise data associated with the state of the first application 116a, the file 117c being periodically accessed and updated by the processor 114 while it is running the first application 116a. The first application 116a may further comprise other files (not depicted) resident on the computing device 110. Similarly, the file 117d may comprise an executable file for running the second application 116b on the computing device 110, when the file 117d is processed by the processor 114.

Each file 117a, 117b, 117c, and 117d is associated with a unique code 118a, 118b, 118c and 118d, respectively, each unique code 118a, 118b, 118c and 118d associated with a state of its associated file. In some embodiments, each unique code 118a, 118b, 118c and 118d comprises a version number of its associated file and other information identifying its associated file. In other embodiments, each unique code 118a, 118b, 118c and 118d may comprise data obtained by processing its associated file. In these embodiments, each unique code 118a, 118b, 118c and 118d may be obtained by applying a hash algorithm to its associated file 117a, 117b, 117c, and 117d, respectively.

In some embodiments, the computing device 110 is further enabled to generate state data 111, the state data 111 comprising data associated with the state of the computing device 110. Data associated with the state of the computing device 110 may comprise data associated with applications installed on the computing device 110 including, but not limited to, the name of at least one file resident at the computing device 110 and/or data associated with the file (e.g. file version, a date the file was installed on the computing device 110, a date the file was released etc. and/or an application name) and/or data associated with the application (e.g. application version, a date the application was installed on the computing device 110, a date the application was released, etc.). In some embodiments, the state data 111 may comprise a unique code, for example the unique code 118a, 118b, 118c and 118d described above. In other embodiments, the state data 111 may comprise other types of data, as described below. In some embodiments, the computing device 110 is enabled to transmit the state data 111 to a remote entity upon receiving a request for state data 111 from the remote entity. In other embodiments, the computing device 110 is enabled to transmit the state data 111 to a remote entity periodically, for example when the computing device 110 is turned on and/or reboots and/or when the state of the computing device 110 changes. In some embodiments, the remote entity may comprise at least one of the communications server 120 and the update details server 125, as described below.

Additional functionality of the computing device 110 is discussed below, with reference to the interaction of the computing device 110 with other elements of the architecture depicted in FIG. 1, the method of FIG. 2, the method of FIG. 3, and FIG. 4.

The administration server 150 is enabled to transmit software update information 147 to the database 145 for storage, and further enabled to transmit at least one software update file 148 to the patch server 130. The administration server 150 comprises a communications interface 192 for enabling communications with the patch server 130, the database 145 and, in some embodiments, a software provider (not depicted). The communications interface 192 may be any suitable interface, either wired, wireless, or a combination thereof, for enabling these communications. In some embodiments, the administration server 150 further comprises a processor 194 for processing data. In other embodiments, the administration server 150 further comprises a memory 196 for storing data. In some embodiments, the administration server 150 may be in communication with at least one software provider (not depicted) that provides the at least one software update file 148 and/or software update information 147. In some embodiments, administration server 150 may be enabled to generate at least a portion of the software update information 147 by processing the at least one software update file 148, for example via the processor 194. In other embodiments, the administration server 150 receives the at least one software update file 148 and/or the software update information 147 from the at least one software provider via a communication network, for example via the communications interface 192. In other embodiments, the administration server 150 receives the at least one software update file 148 and/or the software update information 147 from the least on software provider via a transportable medium, such as a magnetic or optical disc, a flash memory and the like. In these embodiments, the software update files 148 and/or the software update information 147 are uploaded to the administration server 150 by an administrator.

In some embodiments, the at least one software update file 148 comprises data for updating a file resident on the computing device 110, to effect an update of the computing device 110, a method of updating the computing device 110 being described below with respect to FIG. 3. In a non-limiting example, the at least one software update file 148 may comprises update files 119a, 119b, 119c and 119d, wherein update file 119a is intended to update the file 117a, update file 119b is intended to update the file 117b, update file 119c is intended to update the file 117c, and update file 119d is intended to update the file 117d.

The software update information 147 comprises data associated with the at least one software update file 148. The software update information 147 may include, but is not limited to, the name of at least one software update file, and/or data associated with the at least one software update file (e.g. file version, a date the file was released etc.), and/or a name of at least one file that is to be updated, that may be resident at the computing device 110, and/or data associated with the file (e.g. file version, a date the file was released etc.) and/or an application name and/or data associated with the application (e.g. application version, a date the application was released, etc.). In a non-limiting embodiment, the software update information 147 comprises: an identifier of the at least one software update file 148, an identifier of the file resident on the computing device 110 that the at least one software update file 148 is intended to update, a location from where the at least one software update file 148 may be retrieved, and instructions for updating the file resident on the computing device 110 using the at least one software update file 148. In some embodiments the instructions are processable by the computing device 110 to effect an update of the file resident on the computing device 110 using the at least one software update file 148. In some embodiments the software update information 147 may further comprise: an identifier of the application associated with the file resident on the computing device 110 that the at least one software update file 148 is intended to update; an identifier of the application that the at least one software update file 148 is associated with (e.g. a name of the updated application); a description of the at least one software update file 148; and/or a unique reference code identifying the expected state of the file resident on the computing device 110 that the at least one software update file 148 is intended to update. In a non-limiting example, the software update information comprises unique reference codes 141a, 141b, 141c, and 141d, each associated with one of the update files 119a, 119b, 119c, and 119d, respectively.

In embodiments where the software update information 147 comprises a unique reference code, the unique reference code (e.g. unique reference codes 141a, 141b, 141c, and 141d) may be generated in a similar manner to the unique code described above with reference to the computing device 110 (e.g. the unique codes 118a, 118b, 118c and 118d), and using a reference file as an input to the hash algorithm. The reference file is identical to a file that the at least one software update file 148 (e.g. the update files 119a, 119b, 119c, and 119d) is intended to update, for example a file resident on the computing device 110 (e.g. the files 117a, 117b, 117c and 117d). In some embodiments, the unique reference code is generated by the software provider. In other embodiments, the reference file is received at the administration server 150 from the at least one software provider in a manner similar to that described with reference to receiving the at least one software update file 148. In these embodiments, the administration server 150 is enabled to generate the unique reference code from the reference file.

In some embodiments, at least a portion of the software update information 147 is transmitted to the patch server 130 by the administration server 150. In these embodiments the at least a portion of the software update information 147 may further comprise instructions for updating the file resident on the computing device 110 using the data for updating the file resident on the computing device 110. These embodiments are described in more detail below.

The administration server 150 is further operable to transmit the software update files 148 to the patch server 130, and to transmit the software update information 147 to the database 145, for example via the communications interface 192.

The patch server 130 comprises a patch database 132 for storing the at least one software update file 148. In some embodiments, the administration server 150 is further operable to transmit at least a portion of the software update information 147 to the patch server 130 for storage at the patch database 132, for example via the communications interface 192. In some embodiments the at least a portion of the software update information 147 comprises the identifier of the at least one software update file 148, and/or the identifier of the file resident on the computing device 110 that the at least one software update file 148 is intended to update and/or the unique reference code identifying the expected state of the file resident on the computing device 110 that the at least one software update file 148 is intended to update. The patch server 130 is enabled to receive and store the at least one software update file 148 (and the at least a portion of the software update information 147, if applicable). The patch server 130 further comprises a communications interface 182 for enabling communications with the administration server 150, and the computing device 110. The communications interface 182 may be any suitable interface, wired, wireless, or a combination thereof, for enabling these communications. In some embodiments, the patch server 130 further comprises a processor 184 for processing data. Further functionality of the patch server 130 will be described with respect to FIGS. 3 and 4.

The database 145 is operable to receive and store the software update information 147. In some embodiments the database 145 may comprise a processor (not depicted) for processing and managing data. In other embodiments the processor is in an element of a computing apparatus (not depicted) which processes and manages data stored at the database 145. In some embodiments, the database 145 comprises a table T1, for storing the software update information 147. T1 comprises at least one record, the at least one record for storing software update information associated with the at least one software update file 148, and populated by the data received in the software update information 147. In general, each record in the table T1 is associated with a different software update file. In one non-limiting embodiment, T1 comprises a plurality of rows, each row representative of a record of a given software update file. The columns of each row may correspond to:

an identifier of the given software update file;
an identifier of the file resident on the computing device 110 that the given software update file is intended to update;
a location from where the given software update file may be retrieved;
instructions for updating the file resident on the computing device 110 using the given software update file;
an identifier of the application associated with the file resident on the computing device 110 that the given software update file 148 is intended to update;
an identifier of the application that the given software update file 148 is associated with (e.g. a name of the updated application);
a description of the given software update file 148; and/or
the unique reference code identifying the expected state of the file resident on the computing device 110 that the given software update file 148 is intended to update.

In a non-limiting example, with reference to the non-limiting example from above, T1 comprises:

| File Identifier | File Description | File Location | Identifier of File to be Updated | Unique Reference Code of Expected State of File to be Updated | Instructions | Application Name |
|---|---|---|---|---|---|---|
| 119a | Updates File 117a to 117a' (Update from OS6 to OS7) | Patch Server 130 Network Address | 117a | 141a | Replace bytes xyz of File 117a with 119a | Operating System Version 7 |
| 119b | Updates File 117b to 117b' (Update from OS6 to OS7) | Patch Server 130 Network Address | 117b | 141b | Replace File 117b with 119b | Operating System Version 7 |
| 119c | Updates File 117c to 117c' (Update from OS6 to OS7) | Patch Server 130 Network Address | 117c | 141c | Append 119c to 117c | Operating System Version 7 |
| 119d | Updates File 117d to 117d' (Update from BB4 to BB5) | Patch Server 130 Network Address | 117d | 141d | Replace bytes abc of File 117d with 119d | FunGame Version 5 |

In this example, the first column comprises the identifier of a given software update file (e.g. the name of the update file 119a, 119b, etc.). The second column comprises a description of the software update file. For example, the description may comprise a specific action that the given software update file is intended to effect, such as an update to a specific file, or an update to an associated application. The third column comprises the location of the given software update file, in this example the network address of the patch server 130. The fourth column comprises the identifier of the file resident on the computing device 110 that is to be updated (e.g. the name of the file 117a, 117b, etc.). The fifth column comprises the unique reference code identifying the expected state of the file resident on the computing device 110 that the at least one software update file 148 is intended to update (e.g. the unique reference code 141a, 141b, etc.).

The sixth column comprises instructions for updating the file resident on the computing device 110, (e.g. the file 117a, 117b, etc.) using the given software update file (e.g. the update file 119a, 119b, etc.). As depicted, the instructions may comprise at least one of instructions to replace at least a portion of a file resident on the computing device 110 with the given software update file: instructions to concatenate the given software update file and the file resident on the computing device 110, by either appending the given software update file to the end of the file resident on the computing device 110, or by adding the given software update file to the beginning of the file resident on the computing device 110; instructions to replace the entirety of a file resident on the computing device 110 with the given software update file; or instructions to delete at least a portion of a file resident on the computing device 110. In some embodiments, as described below, the instructions for updating the file resident on the computing device 110 (e.g. the file 117a, 117b, etc.) using the given software update file (e.g. the update file 119a, 119b, etc.) may be stored at the patch server 130.

The seventh column comprises an identifier of the application with which the given software update file 148 is associated (e.g. a name of the updated application, such as a new version of an operating system or a new version of an application).

In other embodiments, the data stored in the table T1 may be distributed among a plurality of tables within the database 145.

In some embodiments, a given software update file may be intended to update a plurality of files resident on the computing device 110. In some of these embodiments, separate records (e.g. different rows) may exist in T1 for each of the plurality of files resident on the computing device 110 that the given software update file is intended to update, while in other embodiments, a single record may exist for the plurality of files resident on the computing device 110 that the given software update file is intended to update. In these embodiments the plurality of files resident on the computing device 110 that are to be updated by the given software update file may be associated with a single application, or with a plurality of applications.

In some embodiments, more than one given software update file may be intended to update the same file resident on the computing device 110, for example by replacing different portions of the file with the different given software update files, or by replacing a portion of the file with a first software update file, and concatenating a second software update file to the same file.

In some embodiments, the database 145 may store additional information related to available software updates. In some embodiments the database 145 comprises an over the air software loading (OTASL) database. In these embodiments, the OATSL database may also store verbiage to describe software update files, dependency data, and acceptance data.

The patch availability server 140 is enabled to receive data 142 from database 145, the data 142 comprising uncached software update information, derived, for example, from Table T1. In some embodiments, the patch availability server 140 is enabled to retrieve the data 142 from the database 145, by transmitting a request to the database 145. In other embodiments, the database 145 is enabled to transmit the data 142 to the patch availability server 140, for example when software update information 147 is received from the administration server 150

In some embodiments, the uncached software information may comprise information indicating that a given software update is available. In these embodiments, the data 142 may include, but is not limited to, an application name and/or data associated with the application (e.g. application version, a date the application was released, etc.), the name of at least one file that is to be updated, that may be resident at the computing device 110 and/or data associated with the file (e.g. file version, a date the file was released etc.). In the non-limiting example described above with reference to table T1, the data 142 may include, but is not limited to, data from the columns labelled "File Description" and/or "Identifier of File to be Updated" and/or "Unique Reference Code of Expected State of File to be Updated" and/or "Application Name".

In other embodiments, the data 142 comprises information that may be processed by the communications server 120 to assist in the determination of a state of the computing device 110, including, but not limited to, an identifier of the at least one software update file 148, and a unique reference code identifying the expected state of the file resident on the computing device 110 that the at least one software update file 148 is intended to update. In some of these embodiments, data 142 may further comprise: an identifier of the file resident on the computing device 110 that the at least one software update file 148 is intended to update; an identifier of the application associated with the file resident on the computing device 110 that the at least one software update file 148 is intended to update; an identifier of the application that the at least one software update file 148 is associated with (e.g. a name of the updated application); and/or a description of the at least one software update file 148.

In these embodiments, within the non-limiting example described above with reference to table T1, the data 142 may include, but is not limited to, data from the columns labelled "File Identifier", and "Unique Reference Code of Expected State of File to be Updated".

In yet other embodiments, the data 142 comprises information to effect an update of the computing device 110. In these embodiments, data 142 comprises information for effecting an update of the computing device 110, including, but not limited to, an identifier of the at least one software update file 148, an identifier of the file resident on the computing device 110 that the at least one software update file 148 is intended to update, a location from where the at least one software update file 148 may be retrieved, and instructions for updating the file resident on the computing device 110 using the at least one software update file 148.

In these embodiments, within the non-limiting example described above with reference to table T1, the data 142 may include, but is not limited to, data from the columns labelled "File Identifier", "File Location", "Identifier of File to be Updated", and "Installation Instructions".

In some embodiments, the patch availability server 140 may be enabled to store and manage the data 142. The patch availability server 140 comprises a communications interface 162 for enabling communications with the database 145, and the communications server 120. The communications interface 162 may be any suitable interface, wired, wireless, or a combination thereof, for enabling these communications. In some embodiments, the patch availability server 140 further comprises a processor 164 for processing data. In some of embodiments, the patch availability server 140 comprises a memory 139 for storing the data 142. In these embodiments, the patch availability server 140 may store data 142 for a given time period, the data 142 being deleted after the given time period. The patch availability server 140 is further enabled to transmit data 143 to the communications server 120. The data 143 comprises software update information. The patch availability server 140 is hence further enabled to generate the data 143 by processing the data 142. In some embodiments, the data 143 comprises a subset of the data 142. In other embodiments, the data 143 comprises a subset of the data 142 processed so that the subset of the data 142 is, in turn, processable by the communications server 120. In some embodiments the data 143 is generated when a request (not depicted) for the data 143 is received from the communications server 120. In other embodiments the data 143 is generated upon receipt of the data 142. In some embodiments the data 143 is transmitted to the communications server 120 when a request is received from the communications server 120, while in other embodiments the data 143 is transmitted to the communications server 120, upon generation of the data 143.

The communications server 120 is enabled to communicate with the computing device 110 to convey information to the computing device 110, including a notification 122 for notifying the computing device 110 that a software update is available. The communications server 120 comprises a communications interface 152 for enabling communications with the patch availability server 140, and the computing device 110. The communications interface 152 may be any suitable interface, wired, wireless, or a combination thereof, for enabling these communications. In some embodiments, the communications server 120 further comprises a processor 154 for processing data. The notification 122 may be generated upon receipt of data 143 from the patch availability server 140, the data 143 generally comprising software update information, as described below. In some embodiments, the communications server 120 is enable to request the data 143 from the patch availability server 140. In some embodiments, the communications server 120 comprises a memory 123 for storing the data 143. In some of these embodiments, the memory 123 is further enabled to store the state data 111 received from the computing device 110.

The communications server 120 is further enabled to generate the notification 122 by processing the data 143, for example via processor 154. In some embodiments, the notification 122 comprises a subset of the data 143. In other embodiments, the notification 122 comprises a subset of the data 143 processed so that the subset of the data 143 is, in turn, processable by the computing device 120.

In other embodiments the communications server 120 is further enabled to receive the state data 111 from the computing device 110, for example via the communications interface 120. In these embodiments, the communications server 110 may be further enabled to store the state data 111, for example in the memory 123. In some embodiments, the communications server 120 is enabled to periodically request the state data 111. In other embodiments, the computing device 110 is enabled to periodically send a state of the computing device 110 to the communications server 120, as described above.

In some embodiments, the notification 122 is transmitted to the computing device 110, for example via the communications interface 152, if at least a portion of the state data 111 matches at least a portion of the data 143. If a match is found between at least a portion of the state data 111 and at least a portion of the data 143, the notification 122 is transmitted. In some embodiments, if no match is found between at least a portion of the state data 111 and at least a portion of the data 143, the notification 122 is not transmitted. In a non-limiting example, the data 143 may comprise data that a software update is available for a given version of a given application. If the state data 111 of the computing device 110 comprises data that the given version of the given application is installed on the computing device 110, the notification 122 is transmitted to the computing device 110. In embodiments where the state data 111 is stored at the communications server 120, for example in embodiments where the communications server 120 has requested the state data 111 from the computing device 110, or in embodiments where the computing device 110 periodically transmits the state data 111 to the communications server 120, the notification 122 may be further configured to trigger updating the state of the computing device 110, as described below.

In some embodiments, the communications server 120 is farther configured to process the state data 111 received from the computing device 110 and the data 143 to determine a state of the computing device 110, using the method of FIG. 2, described below.

In some embodiments, the communications server 120 may be further enabled to manage synchronization of data between the computing device 110 and another computing device. In embodiments where the computing device 110 comprises a handheld electronic device, the communications server 120 may be enabled to manage synchronization of data between the handheld electronic device and a personal computer. In a non-limiting example, the communications server may be enabled to manage synchronization of data between desktop and mobile software, including but not limited to email and personal information management (PIM) data.

Turning now to the update details server 125, which is enabled to receive data 144 from the database 145, the data 144 generally comprising uncached software update metadata derived, for example, from Table T1. The update details server 125 comprises a communications interface 172 for enabling communications with the database 145, and the computing device 110. The communications interface 172 may be any suitable interface, wired, wireless, or a combination thereof, for enabling these communications. In some embodiments, the update details server 125 further comprises a processor 174 for processing data. In some embodiments, the update details server 125 is enabled to retrieve the data 144 from the database 145, by transmitting a request to the database 145, for example via the communications interface 172. In other embodiments, the database 145 is enabled to transmit the data 144 to the update details server 125, for example when software update information 147 is received from the administration server 150. The update details server 125 is further configured to receive the state data 111 from the computing device 110, for example via the communications interface 172. In some embodiments, the update details server 125 is yet further configured to process the state data 111 received from the computing device 110 and the data 144 to determine a state of the computing device 110, for example via the processor 174, using the method of FIG. 2, described below.

In these embodiments, the data 144 comprises information that may be processed by the update details server 125 to assist in the determination of a state of the computing device 110 including, but not limited to, an identifier of the at least one software update file 148, and a unique reference code identifying the expected state of the file resident on the computing device 110 that the at least one software update file 148 is intended to update, as described above. In some of these embodiments the software update metadata may further comprise: an identifier of the file resident on the computing device 110 that the at least one software update file 148 is intended to update; an identifier of the application associated with the file resident on the computing device 110 that the at least one software update file 148 is intended to update; an identifier of the application that the at least one software update file 148 is associated with (e.g. a name of the updated application); and/or a description of the at least one software update file 148.

In these embodiments, within the non-limiting example described above with reference to table T1, the data 144 may include, but is not limited to, data from the columns labelled "File Identifier", and "Unique Reference Code of Expected State of File to be Updated".

In some of these embodiments, the update details server 125 is further enabled to request the state data 111 from the computing device 110 to assist in determining the state of the computing device 110. In other embodiments, the computing device 110 is enabled to transmit the state data 111 to the update details server 125 upon receipt of the notification 122, discussed above.

In some embodiments where the notification 122 is received by the computing device 110, the state data 111 may further comprise a subset of the notification 122 including, but not limited to, an identifier of at least one software update file 148 and/or a description of the at least one software update file 148. In these embodiments, the update details server 125 is enabled to process the state data 111 and the data 144 to determine a state of the computing device 110 by comparing at least a subset of the state data 111 to at least a subset of the data 144, described below with reference to FIG. 2.

In some embodiments, the update details server 125 may be enabled to store and manage the data 144. In these embodiments, the update details server 125 comprises a memory 127 for storing the data 144. In some of these embodiments, the update details server 125 may only store data 144 for a given time period, the data 144 being deleted after the given time period.

Figure 2:
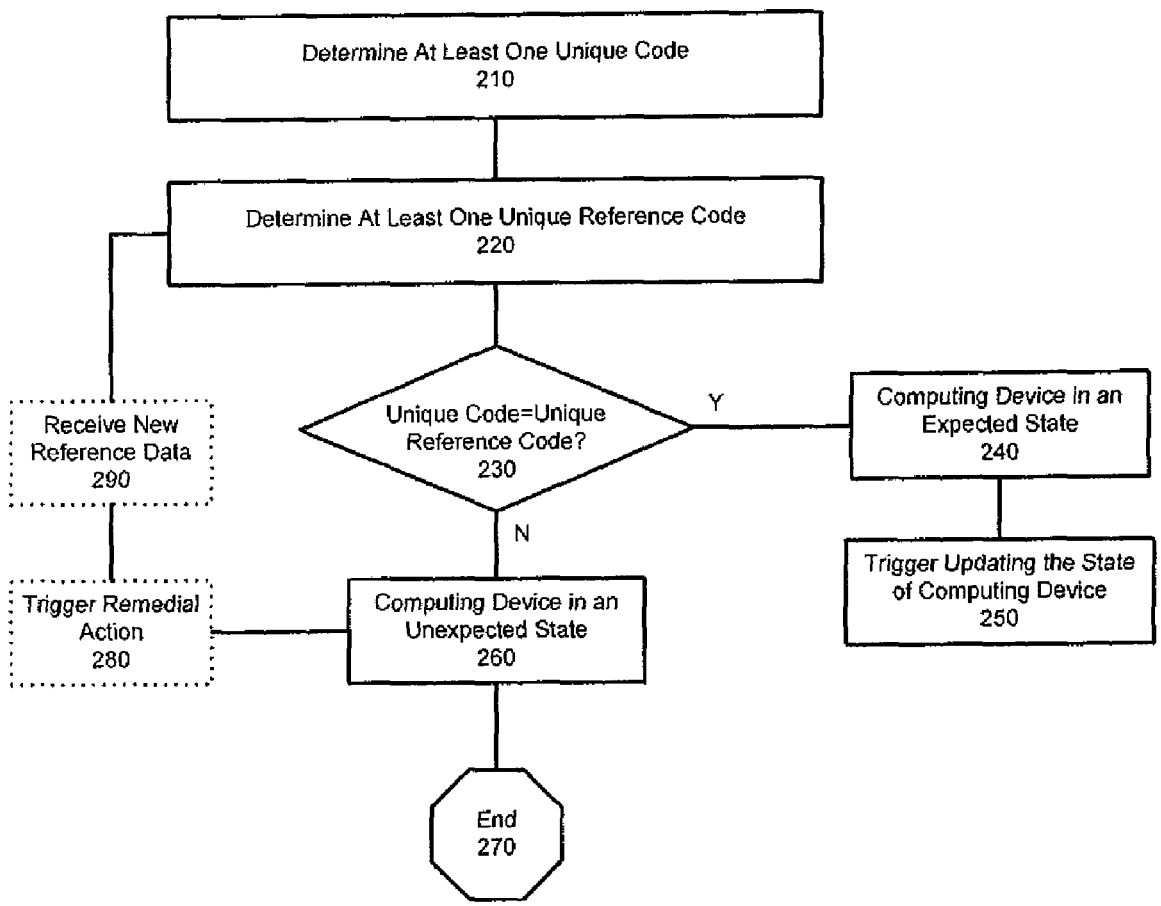
FIG. 2 depicts a method for determining the state of a computing device, according to a non-limiting embodiment.

FIG. 2 depicts a method of determining the state of the computing device 110. The method of FIG. 2 may be performed by at least one of the computing device 110, the communications server 120, the update details server 125, or another computing entity enabled to receive and process the state data 111 and reference data, to be described below.

At step 210, at least one unique code associated with at least one file resident on the computing device, is determined, the at least one unique code is representative of a state of the at least one file. In a non-limiting embodiment, the state data 111 is processed to extract a unique code associated with a state of at least one file resident on the computing device 110, for example the unique codes 118a, 118b, 118c and 118d as described above. In a prior step, as described above, the unique code has been incorporated into the state data 111. In embodiments where the method of FIG. 2 is performed by the computing device 110, the state data 111 comprises at least a portion of the contents of the memory 115 including, but not limited to, the unique code(s). In other non-limiting embodiments, the at least one unique code may be determined in another manner.

At step 220, at least one unique reference code associated with at least one update file is determined, the at least one update file for updating the at least one file resident on the computing device, and the at least one unique reference code representative of an expected state of the at least one file resident on the computing device in a non-limiting embodiment, reference data is processed to extract a unique reference code associated with an expected state of at least one file resident on the computing device 110, that the at least one software update file 148 is intended to update, for example unique reference codes 141a, 141b, 141c, and 141d, as described above. In a prior step (not depicted) the unique reference code has been incorporated into the reference data. In some embodiments the reference data may comprise at least a portion of the data 144. In other embodiments, the reference data may comprise at least a portion of the data 143. In embodiments where the method of FIG. 2 is performed by the computing device 110, the reference data may be transmitted to the computing device by the communications server 120, the update details server 125 or another computing entity. In a non-limiting example, the reference data may comprise the notification 122. In other non-limiting embodiments, the at least one unique reference code associated with at least one update file may be determined in another manner.

At step 230, the unique code is compared to the unique reference code. For example, each unique code 118a, 118b, 118c and 118d is compared to at least one of each unique reference code 141a, 141b, 141c and 141d. If a match is found, the computing device 110 is determined to be in an expected state at step 240. In these embodiments, the determination that the computing device 110 is in an expected state further allows a computing entity to verify that the at least one software update file 148 is intended to update the file resident on the computing device 110 (for example files 117a, 117b, 117c or 117d) which is associated with the unique code received in the state data 111 (for example the unique codes 118a, 118b, 118c or 118d). In these embodiments, the computing entity which is performing the method of FIG. 2 may then trigger the updating the state of the computing device 110, as described with reference to the method of FIG. 3.

If a match is not found between the unique code and the unique reference code at step 230, the computing device 110 is determined to be in an unexpected state at step 260. In these embodiments, the determination that the computing device 110 is in an unexpected state further allows a computing entity to verify that the at least one software update file 148 is not intended to update the file resident on the computing device 110 (for example files 117a, 117b, 117c and 117d) which is associated with the unique code received in the state data 111 (for example the unique codes 118a, 118b, 118c or 118d).

In these embodiments, the computing entity which is performing the method of FIG. 2 may then end further data processing at step 270. In other words, the determination that the computing device 110 is in an unexpected state prevents the triggering of the update of the computer device, as at least one software update file 148 is not intended to update the file resident on the computing device 110 which is associated with the unique code received in the state data 111. Indeed, if the at least one software update file 148 was used to update a file that it was not intended to update, the computing device 110 may be rendered useless. In these instances, one of skill in the art might refer to the computing device 110 which has been rendered useless as "a brick".

In an alternative embodiment, if the computing device 110 is determined to be in an unexpected state at step 260, the computing entity performing the method of FIG. 2 may not end processing at step 270, but rather trigger remedial action at step 280. In some of the embodiments, the remedial action may comprise, for example, conveying a message to a user of the computing device 110 to contact an administrator of the architecture of FIG. 1. In some embodiments the message comprises at least one of an e-mail message, a phone message, a fax message and the like. In other embodiments, the remedial action may comprise the retrieval of new reference data from either the database 145 or the administration server 150, or a software provider via the administration server 150, to determine which software updates are needed to effect an update of the state of the computing device 110. In one embodiment, the unique code in the state data 111 may be processed to determine and request an additional software update that is intended to update the file resident on the computing device 110, by transmitting the at least one unique code which did not match the unique reference code to a remote computing entity, the at least one additional software update associated with at least one additional unique reference code which matches the at least one unique code.

In some embodiments, a first portion of the computing device 110 may be in an expected state and a second portion of the computing device 110 may be in an unexpected state. For example, in these embodiments, the reference data may comprise a plurality of reference codes, each reference code associated with a different software update file, the different software update files intended to update files resident on the computing device 110, associated with two applications installed on the computing device 110. In some embodiments, the files associated with the first application may be in an expected state (the first portion), while the files associated with the second application may be in an unexpected state (the second portion). In these embodiments, the computing entity which is performing the method of FIG. 2 may then trigger the updating of the state of the first portion of the computing device 110, and may either prevent the trigger of the updating of the state of the second portion of the computing device, or trigger remedial action, as described above.

Once the state of the computing device 110 has been determined, the updating of the computing device 110 may be triggered by the update details server 125, for example by transmitting a message 129 to the computing device, or the communications server 120, for example by transmitting the notification 129 to the computing device 110.

In embodiments where the update details server 125 triggers updating of the computing device 110, the data 144 (and hence the data 144), comprises information to effect an update of the computing device 110 including, but not limited to, an identifier of the at least one software update file 148, an identifier of the file resident on the computing device 110 that the at least one software update file 148 is intended to update, a location from where the at least one software update file 148 may be retrieved, and instructions for updating the file resident on the computing device 110 using the at least one software update file 148. In some of these embodiments the data 144 may further comprise: an identifier of the application associated with the file resident on the computing device 110 that the at least one software update file 148 is intended to update; an identifier of the application that the at least one software update file 148 is associated with (e.g. a name of the updated application); a description of the at least one software update file 148; and/or a unique reference code identifying the expected state of the file resident on the computing device 110 that the at least one software update file 148 is intended to update.

In these embodiments, within the non-limiting example described above with reference to table T1, the data 144 may include, but is not limited to, data from the columns labelled "File Identifier", "File Location", "Identifier of File to be Updated", and "Installation Instructions".

In both of these embodiments, the notification 122 or the message 129 comprises information for effecting an update of the computing device 110, including, but not limited to, an identifier of the at least one software update file 148, an identifier of the file resident on the computing device 110 that the at least one software update file 148 is intended to update, a location from where the at least one software update file 148 may be retrieved, and instructions for updating the file resident on the computing device 110 using the at least one software update file 148. In some of these embodiments the notification 122 or the message 129 may further comprise: an identifier of the application associated with the file resident on the computing device 110 that the at least one software update file 148 is intended to update; an identifier of the application that the at least one software update file 148 is associated with (e.g. a name of the updated application); a description of the at least one software update file 148; and/or a unique reference code identifying the expected state of the file resident on the computing device 110 that the at least one software update file 148 is intended to update.

In these embodiments, the update details server 125 (or the communications server 120) processes the data 144 to produce the message 129 (or the notification 122, respectively). The message 129 (or the notification 122) is processable by the computing device 110, and comprises instructions for updating the state of the computing device 110 by requesting at least one update file from at least one remote computing entity, the at least one update file for updating a file resident on the computing device 110. In some embodiments the at least one update file comprises the at least one software update file 148, for example at least one of update files 119a, 119b, 119c and 119c. The other embodiments, the at least one remote computing entity comprises the patch server 132. In yet other embodiments, the file resident on the computing entity 110 comprises, in a non-limiting example, at least one of the files 117a, 117b, 117c and 117d.

In some embodiments, the instructions for updating the state of the computing device 110 comprise instructions to request the at least one update file from the remote computing entity. In some embodiments, the instructions may comprise explicit instructions that the computing entity 110 may process to request the at least one update file from the remote computing entity. In these embodiments, the explicit instructions comprise instructions in a programming language processable by the computing device 110. In these embodiments, the update details server 125 is further enabled to process the data 144 to produce instructions in a programming language, processable by the computing device 110. In one non-limiting embodiment, the explicit instructions comprise instructions in a markup language. In a non-limiting example, the markup language may comprise Extensible Markup Language (XML). In other embodiments, the instructions may comprise key-value pairs, as known to one of skill in the art.

In other embodiments, the instructions may comprise a data set which enables the computing device 110 to produce explicit instructions for updating the state of the computing device 110 by requesting at least one update file from at least one remote computing entity, the at least one update file for updating a file resident on the computing device 110. In these embodiments the explicit instructions may be produced by processing the data set.

In some embodiments, the update details server 125 (or the communications server 120) is enabled to compress at least a portion of the message 129 (or the notification 129, respectively), for example the instructions to request the at least one update file from the remote computing entity, to reduce the size of the message 129 (or the notification 129). In some embodiments, at least a portion of the message 129 (or at least a portion of the notification 129) may be compressed using zip software, as known to one of skill in the art. Non-limiting examples of zip software include gzip, winzip, jar, stuffit and rar. In a non-limiting embodiment, at least a portion of the message 129 is compressed using gzip software. In some embodiments, the at least a portion of the message 129 (or the at least a portion of the notification 129) which is compressed is enabled to uncompress when processed by the computing device 110. For example, the at least a portion of the message 129 (or the at least a portion of the notification 129) may be compressed into a self-uncompressing executable file, which uncompresses when processed by the computing device 110. In these embodiments, no uncompress software need reside on the computing device 110. However, in other embodiments, uncompress software resides on the computing device 110 for uncompressing the compressed at least a portion of the message 129 (or the compressed at least a portion of the notification 129). In some of these embodiments, the uncompress software comprises unzip, as known to one of skill in the art. In embodiments where the at least a portion of the message 129 (or the at least a portion of the notification 129) is compressed using gzip software, the unzip software may also comprise gzip software.

In some embodiments, the instructions comprise a location from where the at least one software update file 148 may be retrieved. In these embodiments, the instructions may comprise an address of the remote computing entity, for example the network address of the patch server 130. In other embodiments, the instructions comprise an identifier of the remote computing entity, for example, an alias of the remote computing entity. In these embodiments, the alias of the remote computing entity may be stored at the computing device 110, along with the address of the remote computing entity, for example in the memory 115, and the computing device 110 is enabled to request the at least one update file from at least one remote computing entity by processing the alias of the remote computing entity.

In yet other embodiments, the address of the remote computing entity is stored at the computing device 110, for example in the memory 115, and the computing device 110 is enabled to retrieve the at least one update file from the remote computing entity upon receipt of the message 129, by processing the address stored at the computing device 110.

In some embodiments, the instructions further comprise instructions for processing the at least one update file to update the state of the remote computing device 110. In these embodiments, the update details server 125 is further enabled to incorporate instructions for updating the file resident on the computing device 110, using the at least one software update file 148 into the instructions to request the at least one update file from the remote computing entity. In a non-limiting example, the instructions comprise the installation instructions from Table T1, as described above.

In embodiments where at least a portion of the software update information 147 is transmitted to the patch server 130 by the administration server 150, the instructions further comprise an identifier of the at least one software update file 148 and/or the unique reference code identifying the expected state of the file resident on the computing device 110 that the at least one software update file 148 is intended to update, as described above. In these embodiments, the at least a portion of the software update information 147 that is transmitted to the patch server 130 by the administration server 150 comprises: the instructions for processing the at least one software update file 148 to update the state of the remote computing device 110, the identifier of the at least one software update file 148 and/or the unique reference code. In these embodiments, the computing device 110 is further enabled to retrieve the instructions for instructions for processing the at least one software update file 148 to update the state of the remote computing device 110, from the patch server 130, by transmitting the identifier of the at least one software update file 148 and/or the unique reference code.

In a non-limiting embodiment, the instructions for updating the state of the computing device 110 comprise the instructions from Table T1, and an instruction to retrieve the at least one software update file 148 from the patch server 130. In this embodiment, the instructions may comprise:

---

Retrieve updates files 119a, 119b, 119c and 119d from the Patch Server having a network address 192.237.34.56
Replace bytes xyz of File 117a with 119a
Replace File 117b with 119b
Append 119c to 117c
Replace bytes abc of File 117d with 119d

---

In some embodiments, the instructions for updating the state of the computing device 110 may further comprise a reboot command.

In another non-limiting embodiment, the instructions for updating the state of the computing device 110 may comprise an instruction to retrieve the at least one software update file 148 from the patch server 130, along with any data for updating the computing device 110 that may have been transmitted to the patch server 130 by the administration server 150, for example at least a portion of the software update information 147, as described above. In these embodiments, the instructions may comprise:

Retrieve updates files 119a, 119b, 119c and 119d and associated data files from the Patch Server having a network address 192.237.34.56

Figure 3:
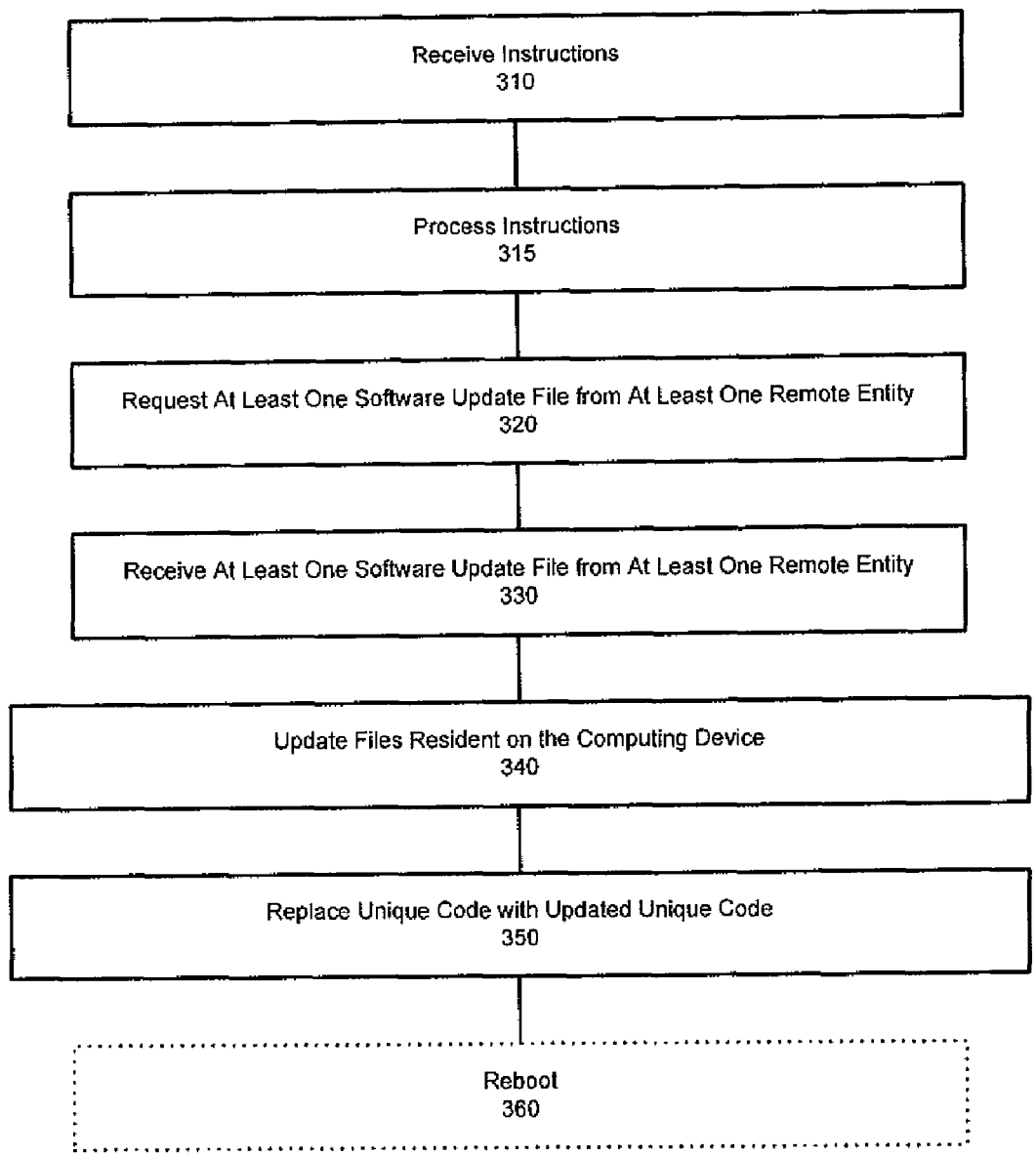
FIG. 3 depicts a method for updating the state of a computing device, according to a non-limiting embodiment.

Turning now to FIG. 3, which depicts a method of updating the state of the computing device 110. The method of FIG. 3 may be performed by the computing device 110. The method depicted in FIG. 3 is described with reference to FIG. 1. and FIG. 4. FIG. 4 depicts an architecture for updating the state of a computing device, according to a non-limiting embodiment. FIG. 4 is substantially similar to FIG. 1, with like elements having like numbering.

At step 310, the computing device 110 receives instructions for updating the state of the computing device 110. In some embodiments, the instructions are received from the update details server 125 via the message 129. In other embodiments, the instructions are received from the communications server 120 via the notification 122. In other embodiments, the instructions are received from another computing entity enabled to generate instructions for updating the state of the computing device 110.

At step 315, the computing device 110 processes the instructions at the processor 114. In some embodiments the instructions may be compressed, as described above. In these embodiments, the computing device 110 may uncompress the compressed instructions. In some of these embodiments, the computing device 110 may uncompress the instructions, by processing the instructions with uncompress software, as described above. In other embodiments, the compressed instructions comprise a self-uncompressing executable file, and the computing device 110 uncompresses the compressed instructions by processing the self-uncompressing executable file, as described above.

In embodiments where the instructions comprise a data set which enables the computing device 110 to produce explicit instructions for updating the state of the computing device 110, the instructions are further processed at step 315 to produce explicit instructions (i.e. instructions in a programming language). For example, in some embodiments, the instructions comprise a location of a remote entity from where the at least one software update file 148 may be retrieved, but may not comprise an explicit instruction for retrieving the file. Hence, at step 315, the explicit instruction is produced using the data set as an input.

At step 320, at least one request 410 for the at least one software update file 148 is transmitted to at least one remote entity from where the at least one software update file 148 may be retrieved. In embodiments where a plurality of software update files are to be retrieved, a plurality of requests may be transmitted, one for each of the plurality of software files. In embodiments where a plurality of software update files are to be retrieved, with the plurality of software update files residing at a single remote entity, a single request may be transmitted, requesting the entirety of the plurality of software update files. In embodiments where a plurality of software update files are to be retrieved, with the plurality of software update files distributed among a plurality of remote entities, a plurality of requests may be transmitted, one for each of the remote entities. In some embodiments, the at least one remote entity comprises the patch server 130.

At step 330, the at least software update file 148 is received from the at least one remote entity, for example via a transmission 420 from the patch server 130. In the non-limiting example depicted in FIG. 4, the transmission 420 comprises update files 119a, 119b, 119c and 119d. In embodiments where the computing device 110 has also retrieved data for updating the computing device 110 that may have been transmitted to the patch server 130 by the administration server 150, the data for updating the computing device 110 is also received at step 330.

At step 340, at least one file resident on the computing device 110 is updated using the at least one software update file 148 to produce at least one updated file. In some embodiments, the at least one updated file is produced by replacing at least a portion of the at least one file resident on the computing device 110 with the at least one software update file 148. In some embodiments, the at least one updated file is produced by concatenating the at least one software update file 148 and the at least one file resident on the computing device 110. In some of these embodiments, the at least one software update file 148 is appended to the end of the at least one file resident on the computing device 110. In other of these embodiments, the at least one software update file 148 is added to the beginning of the at least one file resident on the computing device 110. In other embodiments, the at least one updated file is produced by replacing the entirety of the at least one file resident on the computing device 110 with the at least one software update file 148. In yet other embodiments, the at least one updated file is produced by deleting at least a portion of the at least one file resident on the computing device 110.

Figure 4:
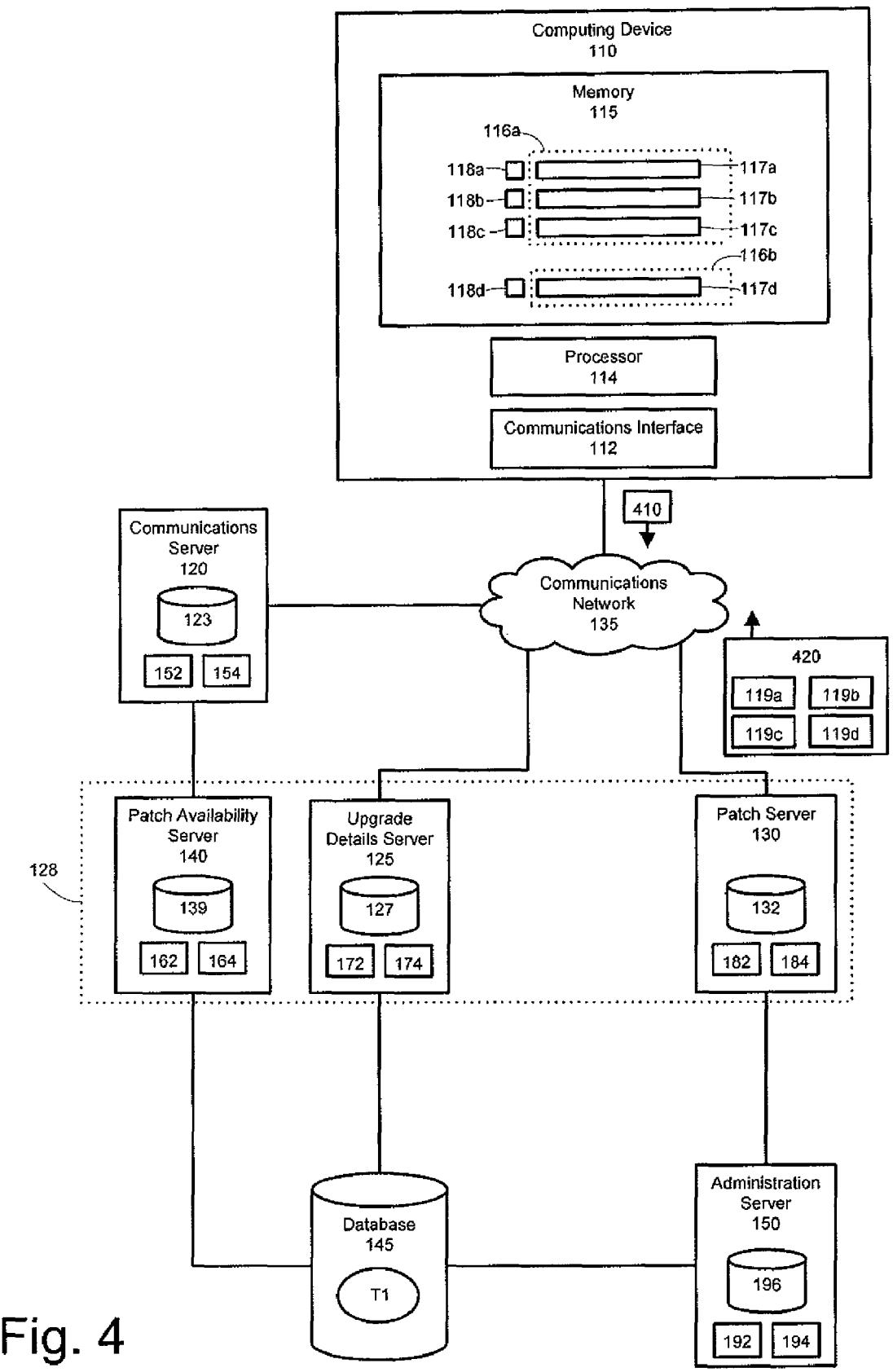
FIG. 4 depicts an architecture for updating the state of a computing device, according to a non-limiting embodiment.

FIG. 4 further depicts the result of processing the instructions contained in the Table T1. The memory 115 comprises files 117a', 117b', 117c' and 117d'. Files 117a', 117b' and 117c' are associated with an updated application 116a', which has been updated from application 116a. File 117d' is associated with an updated application 116b', which has been updated from application 116b. File 117a' has been produced by updating file 117a with update file 119a, update file 119a replacing a portion of file 117a. File 117b' has been produced by updating file 117b with update file 119b, update file 119b replacing the entirety of File 117b. File 117c' has been produced by updating file 117c with update file 119c, update file 119c being appended to File 117c. File 117d' has been produced by updating file 117d with update file 119d, update file 119d replacing a portion of File 117d. Note that producing the at least one updated file by deleting at least a portion of the at least one file resident on the computing device 110 is not depicted in FIG. 4.

In embodiments where the unique code associated with the at least one file resident on the computing device 110, at step 350, the unique code associated with the at least one file resident on the computing device 110, is replaced by an updated unique code associated with the at least one updated file. In some embodiments, the updated unique code is received from the at least one remote entity with the at least one software update file 148, at step 330. In other embodiments, the at least one unique code is generated by the computing device 110 by applying a hash algorithm to the at least one updated file, as described above. FIG. 4 further depicts the result of replacing the at least one unique code with the at least one updated unique code, the memory 115 further comprising updated unique codes 118a', 118b', 118c' and 118d' each associated with a state of files 117a', 117b', 117c' and 117d', respectively.

In some embodiments, the computing device 110 reboots at step 350. In these embodiments the at least one update file is processed by the computing device when the computing device 110 reboots.

Hence, the determination of the state of the computing device 110 may be triggered by transmitting a message (for example, one of the notification 122 or the message 129) to the computing device 110. In some embodiments, the message contains data (for example the unique reference code) which allows the computing device 110 to determine its own state, while in other embodiments the computing device 110 transmits the state data 111 to allow another computing entity (e.g. the communications server 120 or the update details server, or another computing entity) to determine the state of the computing device 110. Once it has been determined that the computing device 110 is in an expected state, another message (for example, one of the notification 122 or the message 129) is transmitted to computing device 110, that comprises data that allows the computing device 110 up update itself.

Those skilled in the art will appreciate that in some embodiments, the functionality of the computing device 110, the communications server 120, the update details server 125, the patch server 130, patch availability server 140, the database 145 and the administration server 150 may be implemented using pre-programmed hardware or firmware elements (e.g., application specific integrated circuits (ASICs), electrically erasable programmable read-only memories (EE-PROMs), etc.), or other related components. In other embodiments, the functionality of the computing device 110, the communications server 120, the update details server 125, the patch server 130, patch availability server 140, the database 145 and the administration server 150 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method, executed by a processor, of determining the state of a computing device comprising,
    determining at least one unique code associated with at least one file resident on the computing device, said at least one unique code representative of a state of the at least one file;
    determining at least one unique reference code associated with at least one reference file identical to at least one file that at least one update file is intended to update;
    determining that the computing device is in an expected state if said at least one unique code matches said at least one unique reference code thereby verifying that said at least one update file is intended to update said at least one file resident on the computing device, and when said computing device is in said expected state, triggering updating of the computing device by using at least one update file for updating said at least one file; and determining that the computing device is in an unexpected state if said at least one unique code does not match said at least one unique reference code thereby verifying that said at least one update file is not intended to update said at least one file resident on the computing device, and when said computing device is in said unexpected state preventing said triggering said updating of the computing device.

2. The method of claim 1, wherein said computing device comprises a handheld electronic device.

3. The method of claim 1, wherein said at least one unique code comprises at least one of a plurality of unique codes, each of the plurality of unique codes associated with one of a plurality of files resident on the computing device, and said at least one unique reference code comprises at least one of a plurality of unique reference codes, each of the plurality of unique reference codes associated with one of a plurality of update files, each update file for updating at least one of said plurality of files resident on the computing device, and further comprising determining that a first portion of the computing device is in said expected state if a first subset of the plurality of unique codes matches a first subset of the plurality of unique reference codes, and that a second portion of the computing device is in said unexpected state if a second subset of the plurality of unique codes does not match a second subset of the plurality of reference codes.

4. The method of claim 1, wherein said determining at least one unique code comprises processing state data, said state data representative of a state of the computing device, and further comprising receiving said state data from the computing device.

5. The method of claim 4, further comprising requesting said state data from the computing device, and said receiving said state data is responsive to said requesting said state data.

6. The method of claim 1, wherein said determining said at least one unique reference code comprises processing software update data, and further comprising receiving said software update data from a remote computing entity.

7. The method of claim 6, further comprising requesting said software update data from said remote computing entity, and said receiving said software update data is responsive to said requesting said state data.

8. The method of claim 1, further comprising generating said at least one unique code by applying a hash algorithm to said at least one file resident on the computing device, and generating said at least one unique reference code by applying said hash algorithm to at least one reference file, wherein said at least one reference file is equivalent to said at least one file resident on the computing device.

9. The method of claim 8, wherein said hash algorithm comprises one of SHA (Secure Hash Algorithm)-1, SHA-224, SHA-256, SHA-384, and SHA-512.

10. The method of claim 1, wherein said triggering said updating comprises: compiling a message processable by the computing device, said message comprising data for instructing the computing device to request said at least one update file from at least one remote computing entity, and transmitting said message to said computing device.

11. The method of claim 1, further comprising triggering remedial action if the computing device is in said unexpected state.

12. The method of claim 11, wherein said remedial action comprises notifying a user of the computing device that the computing device is in said unexpected state.

13. The method of claim 11, wherein said remedial action comprises requesting at least one additional software update from a remote computing entity by transmitting said at least one unique code to said remote computing entity, said at least one additional software update associated with at least one additional unique reference code which matches said at least one unique code.

14. A computing apparatus for determining the state of a handheld electronic device comprising, an interface enabled to receive state data from the handheld electronic device and software update data from a remote computing entity, a processor, coupled to said interface, enabled to:
process said state data to determine at least one unique code associated with at least one file resident on the handheld electronic device, said at least one unique code representative of a state of the at least one file;
process said software update data to determine at least one unique reference code associated with at least one reference file identical to at least one file that at least one update file is intended to update;
determine that the handheld electronic device is in an expected state if said at least one unique code matches said at least one unique reference code thereby verifying that said at least one update file is intended to update said at least one file resident on the handheld electronic device, and determining that the handheld electronic device is in an unexpected state if said at least one unique code does not match said at least one unique reference code thereby verifying that said at least one update file is not intended to update said at least one file resident on the computing device; and
when said handheld electronic device is in said expected state, triggering updating of the handheld electronic device by:
compiling a message processable by the handheld electronic device, said message comprising data for instructing the handheld electronic device to request said at least one update file, for updating said at least one file, from at least one remote computing entity; and
causing said message to be transmitted to the handheld electronic device, via said interface; and
when said computing device is in said unexpected state preventing said triggering said updating of the handheld electronic device.

15. The computing apparatus of claim 14, wherein said at least one unique code is at least one of a plurality of unique codes, each of the plurality of unique codes associated with one of a plurality of files resident on the handheld electronic device, and said at least one unique reference code is at least one of a plurality of unique reference codes, each of the plurality of unique reference codes associated with one of a plurality of update files, each update file for updating at least one of said plurality of files resident on the handheld electronic device, and said processor is further enabled for determining that a first portion of the handheld electronic device is in said expected state if a first subset of the plurality of unique codes matches a first subset of the plurality of unique reference codes, and determining that a second portion of the handheld electronic device is in said unexpected state if a second subset of the plurality of unique codes does not match a second subset of the plurality of reference codes.

16. The computing apparatus of claim 14, said processor further enabled to cause a request for said state data to be transmitted to the handheld electronic device via said interface, and receive said state data via said interface, responsive to transmitting said request for said state data.

17. The computing apparatus of claim 14, said processor further enabled to cause a request for said software update data to be transmitted to the remote computing entity via said interface, and receive said software update data via said interface, responsive to transmitting said request for said software update data.

18. The computing apparatus of claim 14, said processor further enabled to trigger remedial action if the handheld electronic device is in said unexpected state.

19. The computing apparatus of claim 18, wherein said remedial action comprises notifying a user of the handheld electronic device that the computing device is in said unexpected state.

20. The computing apparatus of claim 18, wherein said remedial action comprises requesting at least one additional software update from a second remote computing entity by transmitting said at least one unique code to said remote second computing entity, said at least one additional software update associated with at least one additional unique reference code which matches said at least one unique code.

* * * * *